(12) United States Patent
Powers et al.

(10) Patent No.: US 8,755,105 B2
(45) Date of Patent: Jun. 17, 2014

(54) THERMALLY SWITCHED REFLECTIVE OPTICAL SHUTTER

(75) Inventors: Richard M. Powers, Lakewood, CO (US); Wil McCarthy, Lakewood, CO (US)

(73) Assignee: Ravenbrick LLC, Denver, CO (US)

( * ) Notice: Subject to any disclaimer, the term of this patent is extended or adjusted under 35 U.S.C. 154(b) by 112 days.

(21) Appl. No.: 13/311,212

(22) Filed: Dec. 5, 2011

(65) Prior Publication Data

US 2012/0140311 A1     Jun. 7, 2012

Related U.S. Application Data

(63) Continuation of application No. 12/830,068, filed on Jul. 2, 2010, now Pat. No. 8,072,672, which is a continuation of application No. 12/172,156, filed on Jul. 11, 2008, now Pat. No. 7,755,829.

(60) Provisional application No. 60/959,096, filed on Jul. 11, 2007, provisional application No. 61/015,589, filed on Dec. 20, 2007.

(51) Int. Cl.
| | |
|---|---|
| *G02F 1/01* | (2006.01) |
| *C09K 19/02* | (2006.01) |
| *G02B 26/02* | (2006.01) |
| *E06B 7/00* | (2006.01) |

(52) U.S. Cl.
USPC ........... 359/288; 349/167; 359/227; 52/171.3

(58) Field of Classification Search
CPC ........... E06B 9/24; G02B 27/28; G02F 1/132; G02F 1/133536
USPC ...................... 25/171.3; 257/14; 349/16, 163; 359/227, 265, 275, 288
See application file for complete search history.

(56) References Cited

U.S. PATENT DOCUMENTS

| 3,990,784 A | 11/1976 | Gelber |
|---|---|---|
| 4,006,730 A | 2/1977 | Clapham |

(Continued)

FOREIGN PATENT DOCUMENTS

| CA | 2620005 A1 | 7/2008 |
|---|---|---|
| CN | 1189224 A | 7/1998 |

(Continued)

OTHER PUBLICATIONS

Author Unknown, "Liquid Crystal Research", http://chirality.swarthmore.edu, printed Aug. 21, 2009.

(Continued)

*Primary Examiner* — David N Spector
(74) *Attorney, Agent, or Firm* — Dorsey & Whitney LLP

(57) ABSTRACT

The thermally switched reflective optical shutter is a self-regulating "switchable mirror" device that reflects up to 100% of incident radiant energy above a threshold temperature, and reflects up to 50% of incident radiant energy below a threshold temperature. Control over the flow of radiant energy occurs independently of the thermal conductivity or insulating value of the device, and may or may not preserve the image and color properties of incoming visible light. The device can be used as a construction material to efficiently regulate the internal temperature and illumination of buildings, vehicles, and other structures without the need for an external power supply or operator signals. The device can be tailored to transmit sufficient visible light to see through in both the transparent and reflective states, while still providing significant control over the total energy transmission across the device.

19 Claims, 10 Drawing Sheets

(56) References Cited

U.S. PATENT DOCUMENTS

| | | |
|---|---|---|
| 4,155,895 A | 5/1979 | Rohowetz |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |
| 4,579,638 A | 4/1986 | Scherber |
| 4,640,583 A | 2/1987 | Hoshikawa et al. |
| 4,641,922 A | 2/1987 | Jacob |
| 4,688,900 A | 8/1987 | Doane et al. |
| 4,688,901 A | 8/1987 | Albert |
| 4,755,673 A | 7/1988 | Pollack et al. |
| 4,756,758 A | 7/1988 | Lent |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,859,994 A | 8/1989 | Zola |
| 4,871,220 A | 10/1989 | Kohin |
| 4,877,675 A | 10/1989 | Falicoff et al. |
| 4,893,902 A | 1/1990 | Baughman et al. |
| 4,899,503 A | 2/1990 | Baughman et al. |
| 4,964,251 A | 10/1990 | Baughman et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,132,147 A | 7/1992 | Takiguchi |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,212,584 A | 5/1993 | Chung |
| 5,227,115 A | 7/1993 | Harnischfeger |
| 5,274,246 A | 12/1993 | Hopkins |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai |
| 5,377,042 A | 12/1994 | Chahroudt |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,640 A | 12/1996 | Huston |
| 5,757,828 A | 5/1998 | Ouchi |
| 5,763,307 A | 6/1998 | Wang |
| 5,881,200 A | 3/1999 | Burt |
| 5,889,288 A | 3/1999 | Futatsugi |
| 5,897,957 A | 4/1999 | Goodman |
| 5,937,295 A | 8/1999 | Chen |
| 5,940,150 A | 8/1999 | Faris et al. |
| 6,040,859 A | 3/2000 | Takahashi |
| 6,099,758 A | 8/2000 | Verrall et al. |
| 6,122,103 A | 9/2000 | Perkins et al. |
| 6,208,463 B1 | 3/2001 | Hansen |
| 6,218,018 B1 | 4/2001 | McKown et al. |
| 6,226,067 B1 | 5/2001 | Nishiguchi |
| 6,240,114 B1 | 5/2001 | Anselm |
| 6,260,414 B1 | 7/2001 | Brown |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee |
| 6,320,220 B1 | 11/2001 | Watanabe |
| 6,329,668 B1 | 12/2001 | Razeghi |
| 6,333,516 B1 | 12/2001 | Katoh |
| 6,381,068 B1 | 4/2002 | Harada |
| 6,437,361 B1 | 8/2002 | Matsuda |
| 6,446,402 B1 | 9/2002 | Byker |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz |
| 6,611,640 B2 | 8/2003 | LoCasclo |
| 6,635,898 B2 | 10/2003 | Williams |
| 6,661,022 B2 | 12/2003 | Morie |
| 6,671,008 B1 | 12/2003 | Li et al. |
| 6,710,823 B2 | 3/2004 | Faris et al. |
| 6,718,086 B1 | 4/2004 | Ford |
| 6,730,909 B2 | 5/2004 | Butler |
| 6,753,273 B2 | 6/2004 | Holonyak, Jr. |
| 6,770,916 B2 | 8/2004 | Ohshima |
| 6,777,718 B2 | 8/2004 | Takagi |
| 6,816,525 B2 | 11/2004 | Stintz |
| 6,847,662 B2 | 1/2005 | Bouda |
| 6,859,114 B2 | 2/2005 | Eleftheriades |
| 6,912,018 B2 | 6/2005 | Faris et al. |
| 6,926,952 B1 | 8/2005 | Weber et al. |
| 6,933,812 B2 | 8/2005 | Sarabandi |
| 6,946,697 B2 | 9/2005 | Pietambaram |
| 6,963,435 B2 | 11/2005 | Mallya |
| 6,965,420 B2 | 11/2005 | Li et al. |
| 6,978,070 B1 | 12/2005 | McCarthy et al. |
| 6,985,291 B2 | 1/2006 | Watson |
| 6,992,822 B2 | 1/2006 | Ma |
| 7,026,641 B2 | 4/2006 | Mohseni |
| 7,038,745 B2 | 5/2006 | Weber et al. |
| 7,042,615 B2 | 5/2006 | Richardson |
| 7,046,441 B2 | 5/2006 | Huang |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |
| 7,245,431 B2 | 7/2007 | Watson |
| 7,276,432 B2 | 10/2007 | McCarthy et al. |
| 7,300,167 B2 | 11/2007 | Fernando et al. |
| 7,318,651 B2 | 1/2008 | Chua |
| 7,351,346 B2 | 4/2008 | Little |
| 7,385,659 B2 | 6/2008 | Kotchick |
| 7,470,925 B2 | 12/2008 | Tamura |
| 7,522,124 B2 | 4/2009 | Smith |
| 7,532,397 B2 | 5/2009 | Tanaka |
| 7,538,946 B2 | 5/2009 | Smith |
| 7,561,332 B2 | 7/2009 | Little |
| 7,601,946 B2 | 10/2009 | Powers |
| 7,619,816 B2 | 11/2009 | Deng |
| 7,655,942 B2 | 2/2010 | McCarthy |
| 7,692,180 B2 | 4/2010 | Snyder |
| 7,768,693 B2 | 8/2010 | McCarthy et al. |
| 7,911,563 B2 | 3/2011 | Hung |
| 7,936,500 B2 | 5/2011 | Powers |
| 7,977,621 B2 | 7/2011 | McCarthy |
| 8,076,661 B2 | 12/2011 | McCarthy |
| 8,271,241 B2 | 9/2012 | Akyurtlu |
| 2002/0079485 A1 | 6/2002 | Stintz et al. |
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris |
| 2002/0141029 A1 | 10/2002 | Carlson |
| 2002/0152191 A1 | 10/2002 | Hollenberg |
| 2002/0180916 A1 | 12/2002 | Schadt et al. |
| 2002/0190249 A1 | 12/2002 | Williams |
| 2003/0052317 A1 | 3/2003 | Ohshima |
| 2003/0059998 A1 | 3/2003 | Holonyak, Jr. |
| 2003/0066998 A1 | 4/2003 | Lee |
| 2003/0107813 A1 | 6/2003 | Clabburn |
| 2003/0107927 A1 | 6/2003 | Yerushalmi |
| 2003/0129247 A1 | 7/2003 | Ju et al. |
| 2003/0138209 A1 | 7/2003 | Chan |
| 2003/0218712 A1 | 11/2003 | Kumar et al. |
| 2003/0227663 A1 | 12/2003 | Agrawal |
| 2004/0005451 A1 | 1/2004 | Kretman |
| 2004/0012749 A1 | 1/2004 | Freeman |

(56) References Cited

U.S. PATENT DOCUMENTS

| | | |
|---|---|---|
| 2004/0036993 A1 | 2/2004 | Tin |
| 2004/0256612 A1 | 12/2004 | Mohseni |
| 2005/0068629 A1 | 3/2005 | Fernando et al. |
| 2005/0185125 A1 | 8/2005 | Miyachi |
| 2005/0221128 A1 | 10/2005 | Kochergin |
| 2005/0271092 A1 | 12/2005 | Ledentsov |
| 2006/0147810 A1 | 7/2006 | Koch |
| 2006/0151775 A1 | 7/2006 | Hollenberg |
| 2006/0238867 A1 | 10/2006 | Takeda |
| 2006/0257090 A1 | 11/2006 | Podolskiy |
| 2006/0262398 A1 | 11/2006 | Sangu et al. |
| 2006/0274218 A1 | 12/2006 | Xue |
| 2007/0070276 A1 | 3/2007 | Tan |
| 2007/0121034 A1 | 5/2007 | Ouderkirk |
| 2007/0215843 A1 | 9/2007 | Soukoulis et al. |
| 2007/0279727 A1 | 12/2007 | Gandhi |
| 2008/0013174 A1 | 1/2008 | Allen |
| 2008/0061222 A1 | 3/2008 | Powers et al. |
| 2008/0117500 A1 | 5/2008 | Narendran et al. |
| 2008/0138543 A1 | 6/2008 | Hoshino |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128893 A1 | 5/2009 | McCarthy et al. |
| 2009/0128907 A1 | 5/2009 | Takahashi |
| 2009/0219603 A1 | 9/2009 | Xue |
| 2009/0296190 A1 | 12/2009 | Anderson |
| 2010/0015363 A1 | 1/2010 | Chiang et al. |
| 2010/0027099 A1 | 2/2010 | McCarthy |
| 2010/0051898 A1 | 3/2010 | Kim, II |
| 2010/0060844 A1 | 3/2010 | Sawatari et al. |
| 2010/0118380 A1 | 5/2010 | Xue |
| 2010/0288947 A1 | 11/2010 | McCarthy et al. |
| 2011/0044061 A1 | 2/2011 | Santoro |
| 2011/0205650 A1 | 8/2011 | Powers et al. |
| 2011/0216254 A1 | 9/2011 | McCarthy et al. |

FOREIGN PATENT DOCUMENTS

| | | |
|---|---|---|
| CN | 1350648 A | 5/2002 |
| CN | 1494091 A | 5/2004 |
| EP | 1162496 | 12/2001 |
| GB | 2261989 | 6/1993 |
| JP | 58-010717 | 1/1983 |
| JP | 61-223719 | 10/1986 |
| JP | 1178517 | 7/1989 |
| JP | 02-089426 | 3/1990 |
| JP | 06-158956 | 6/1994 |
| JP | 08-015663 | 1/1996 |
| JP | 10-287449 | 10/1998 |
| JP | 10-311189 | 11/1998 |
| JP | 2002-357815 | 12/2002 |
| JP | 2003-248204 | 9/2003 |
| JP | 2004-004795 | 1/2004 |
| JP | 2005-250119 | 9/2005 |
| JP | 2006-243485 | 9/2006 |
| JP | 2007-515661 | 6/2007 |
| JP | 2007-272016 | 10/2007 |
| JP | 2008-530766 | 8/2008 |
| KR | 2002-0044153 | 6/2002 |
| KR | 2003-0072578 | 9/2003 |
| KR | 10-2004-0048916 | 6/2004 |
| KR | 10-2004-0108816 | 12/2004 |
| KR | 10-2006-0000059 | 1/2006 |
| KR | 10-2007-0091314 | 9/2007 |
| KR | 10-2010-0039401 | 4/2010 |
| WO | 94/02313 A1 | 2/1994 |
| WO | 97/01789 A2 | 1/1997 |
| WO | 01/23173 A1 | 4/2001 |
| WO | 02/064937 A1 | 8/2002 |
| WO | 03/029885 A1 | 4/2003 |
| WO | 03/096105 A1 | 11/2003 |
| WO | 2005/031437 A1 | 4/2005 |
| WO | 2006/023195 A2 | 3/2006 |
| WO | 2006/088369 A2 | 8/2006 |
| WO | 2008/092038 A1 | 7/2008 |
| WO | 2008/106596 A1 | 9/2008 |
| WO | 2008/144217 A1 | 11/2008 |

OTHER PUBLICATIONS

Barbagallo, S., et al., "Synthesis of novel metamaterials," Chapter 2 (VDM Verlag 2008).

Eleftheriades, G.V., et al. (Editors); Iyers, "Negative-Refraction Metamaterials," Chapter 1 (Wiley 2005), pp. 4-5, 16-30, 321-330.

Fan, et al., "Thin-film conducting microgrids as transparent heat mirrors", Appl. Phys. Lett., vol. 28, No. 8, Apr. 5, 1976, 440-442.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, D., et al., "Overview of Nanoelectronic Devices", Proceedings of the IEEE, 85(4):521-533, Apr. 1997.

Hao, J. et al., "Manipulating Electromagnetic Wave Polarizations by Anisotropic Metamaterials," Physical Review Letters, 2007, vol. 99, No. 063908.

Harrison, "Quantum Wells, Wires, and Dots: Theoretical & Computational Physics of Semiconductor Nanostructures" 2nd Edition, John Wiley & Sons, Ltd (2005), 3 pages.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.

Leatherdale, C.A., et al., "Photoconductivity in CdSe Quantum Dot Solids", Phys. Review B, 62(4):2669-2680, Jul. 15, 2000.

Manea, E., et al., "Optical Characterization of $SnO2$ thin Films Prepared by Sol Gel Method, for 'Honeycomb' Textured Silicon Solar Cells," International Semiconductor Conference, 2006, vol. 1, Issue, Sep. 2006, pp. 179-182.

Manea, E., et al., "$SnO2$ Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Sarychev, et al., "Negative refraction metamaterials," Chapter 8 (Wiley 2005).

Siegel, J. D., "The MSVD Low E 'Premium Performance' Myth," International Glass Review, Issue 1, 2002, pp. 55-58.

Sung, J., et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

West, J. L., et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.

Zhang, W., Giant optical activity in dielectric planar metamaterials with two-dimensional chirality, Journal of Optics A: Pure and Applied Optics, 8, pp. 878-890 (2006).

Restriction Requirement dated Dec. 14, 2009, U.S. Appl. No. 12/019,602, 12 pages.

Response to Restriction Requirement filed Jan. 14, 2010, U.S. Appl. No. 12/019,602, 15 pages.

(56) References Cited

OTHER PUBLICATIONS

Notice of Allowance dated Jun. 9, 2010, U.S. Appl. No. 12/019,602, 7 pages.
Voluntary Amendment dated Jan. 11, 2010, AU Application No. 2008207802, 49 pages.
First Office Action dated Sep. 15, 2010, AU Application No. 2008207802, 2 pages.
Response to First Office Action dated Jul. 4, 2011, AU Application No. 2008207802, 9 pages.
Notice of Acceptance mailed Jul. 14, 2011, AU Application No. 2008207802, 3 pages.
Notice of Allowance dated Jul. 28, 2010, CA Application No. 2,620,005, 1 page.
First Office Action dated Aug. 4, 2010 (with English translation), CN Application No. 200880009550.2, 12 pages.
Response to First Office Action dated Feb. 19, 2011 (with English summary), CN Application No. 200880009550.2, 21 pages.
Second Office Action dated Apr. 6, 2011 (with English summary), CN Application No. 200880009550.2, 4 pages.
Response to Second Office Action dated Aug. 2, 2011 (with English summary), CN Application No. 200880009550.2, 16 pages.
Notice of Allowance mailed Nov. 3, 2011 (with English summary), CN Application No. 200880009550.2, 4 pages.
First Office Action dated Mar. 5, 2013 (with English summary), JP Application No. 2009-547428, 5 pages.
Supplemental European Search Report dated May 9, 2011, EP Application No. 08713990.3, 7 pages.
Communication Pursuant to Rules 70(2) and 70a(2) dated May 26, 2011, EP Application No. 08713990.3, 1 page.
Response to Invitation to Proceed filed Nov. 29, 2011, EP Application No. 08713990.3, 18 pages.
Restriction Requirement dated Jan. 26, 2011, U.S. Appl. No. 12/843,218, 8 pages.
Response to Restriction Requirement filed Mar. 28, 2011, U.S. Appl. No. 12/843,218, 8 pages.
Notice of Allowance dated Apr. 12, 2011, U.S. Appl. No. 12/843,218, 9 pages.
Request for Continued Examination filed Jul. 11, 2011, U.S. Appl. No. 12/843,218, 1 page.
Notice of Allowance dated Jul. 22, 2011, U.S. Appl. No. 12/843,218, 8 pages.
Restriction Requirement dated Nov. 14, 2012, U.S. Appl. No. 13/107,626, 15 pages.
Response to Restriction Requirement filed Feb. 14, 2013, U.S. Appl. No. 13/107,626, 8 pages.
Notice of Allowance dated Mar. 20, 2013, U.S. Appl. No. 13/107,626, 13 pages.
Request for Continued Examination dated Jun. 20, 2013, U.S. Appl. No. 13/107,626, 3 pages.
Notice of Allowance dated Nov. 23, 2009, U.S. Appl. No. 12/172,156, 9 pages.
Request for Continued Examination filed Jan. 29, 2010, U.S. Appl. No. 12/172,156, 1 page.
Amendment filed Jan. 29, 2010, U.S. Appl. No. 12/172,156, 11 pages.
Notice of Allowance dated Mar. 11, 2010, U.S. Appl. No. 12/172,156, 6 pages.
First Office Action dated Jan. 13, 2011, AU Application No. 2008274933, 1 page.
Response to First Office Action dated Aug. 4, 2011, AU Application No. 2008274933, 17 pages.
Second Office Action dated Aug. 9, 2011, AU Application No. 2008274933, 3 pages.
Response to Second Office Action dated Feb. 16, 2012, AU Application No. 2008274933, 10 pages.
Notice of Acceptance mailed Feb. 22, 2012, AU Application No. 2008274933, 3 pages.
Preliminary Amendment dated Feb. 23, 2010, CA Application No. 2,693,022, 3 pages.
First Office Action mailed Jul. 21, 2010, CA Application No. 2,693,022, 3 pages.
Response to First Office Action filed Jan. 21, 2011, CA Application No. 2,693,022, 14 pages.
Notice of Allowance dated Mar. 2, 2011, CA Application No. 2,693,022, 1 page.
First Office Action dated Jan. 27, 2011 (with English translation), CN Application No. 200880106571.6, 14 pages.
Response to First Office Action dated Aug. 10, 2011 (with English summary), CN Application No. 200880106571.6, 66 pages.
Second Office Action dated Nov. 22, 2011 (with English translation), CN Application No. 200880106571.6, 9 pages.
Response to Second Office Action dated Apr. 6, 2012 (with English summary), CN Application No. 200880106571.6, 27 pages.
Notice of Issuance mailed Aug. 14, 2012 (with English summary), CN Application No. 200880106571.6, 4 pages.
First Office Action dated Jun. 19, 2012 (with English translation), JP Application No. 2010-516287, 5 pages.
Response to First Office Action dated Dec. 6, 2012 (with English summary), JP Application No. 2010-516287, 12 pages.
Supplemental European Search Report dated Aug. 9, 2011, EP Application No. 08826231.6, 7 pages.
Communication Pursuant to Rules 70(2) and 70a(2) dated Aug. 26, 2011, EP Application No. 08826231.6, 1 page.
Response to EPO Communications filed Feb. 22, 2012, EP Application No. 08826231.6, 18 pages.
Voluntary Amendment dated Feb. 16, 2010 (with English translation), KR Application No. 10-2010-7003004, 32 pages.
First Office Action dated Jun. 10, 2011 (with English translation), KR Application No. 10-2010-7003004, 5 pages.
Response to First Office Action dated Nov. 10, 2011 (with English summary), KR Application No. 10-2010-7003004, 19 pages.
Second Office Action dated Apr. 30, 2012 (with English translation), KR Application No. 10-2010-7003004, 5 pages.
Response to Second Office Action dated Oct. 31, 2012 (with English summary), KR Application No. 10-2010-7003004, 25 pages.
Korean Intellectual Property Office as International Searching Authority, International Search Report and Written Opinion for International Application No. PCT/US2008/069881, Sep. 30, 2008, 10 pages.
Non-final Office Action dated Jan. 7, 2011, U.S. Appl. No. 12/830,068, 5 pages.
Terminal Disclaimer filed Jul. 7, 2011, U.S. Appl. No. 12/830,068, 1 page.
Response to Non-final Office Action filed Jul. 7, 2011, U.S. Appl. No. 12/830,068, 6 pages.
PTO Response to Terminal Disclaimer dated Aug. 3, 2011, U.S. Appl. No. 12/830,068, 1 page.
Notice of Allowance dated Aug. 22, 2011, U.S. Appl. No. 12/830,068, 7 pages.
Notice of Allowance dated Sep. 22, 2011, U.S. Appl. No. 12/340,552, 11 pages.
Request for Continued Examination and Amendment filed Dec. 21, 2011, U.S. Appl. No. 12/340,552, 13 pages.
Notice of Allowance dated Jan. 27, 2012, U.S. Appl. No. 12/340,552, 7 pages.
First Office Action mailed May 24, 2011, AU Application No. 2008345570, 2 pages.
Response to First Office Action filed Aug. 1, 2011, AU Application No. 2008345570, 1 page.
Notice of Acceptance mailed Nov. 29, 2011, AU Application No. 2008345570, 3 pages.
First Office Action mailed Apr. 14, 2011, CA Application No. 2,710,217, 3 pages.
Response to First Office Action filed Oct. 14, 2011, CA Application No. 2,710,217, 14 pages.
Notice of Allowance dated Feb. 3, 2012, , CA Application No. 2,710,217, 1 page.
First Office Action dated Dec. 12, 2011 (with English summary), CN Application No. 200880124576.1, 6 pages.
Response to First Office Action filed Apr. 27, 2012 (with English summary), CN Application No. 200880124576.1, 25 pages.

(56) References Cited

OTHER PUBLICATIONS

Second Office Action dated Oct. 8, 2012 (with English summary), CN Application No. 200880124576.1, 4 pages.
Response to Second Office Action dated Feb. 22, 2013 (with English summary), CN Application No. 200880124576.1, 20 pages.
Voluntary Amendment filed Jan. 23, 2011, (with English summary), JP Application No. 2010-539931, 26 pages.
First Office Action dated Dec. 4, 2012 (with English summary), JP Application No. 2010-539931, 6 pages.
Response to First Office Action filed May 31, 2013 (with English summary), JP Application No. 2010-539931, 22 pages.
Preliminary Claim Amendments filed Oct. 20, 2010, KR Application No. 10-2010-7016005, 16 pages.
First Office Action mailed Sep. 30, 2011 (with English summary), KR Application No. 10-2010-7016005, 1 page.
Response to First Office Action filed Oct. 7, 2011 (with English summary), KR Application No. 10-2010-7016005, 16 pages.
Extended European Search Report dated Aug. 9, 2011, EP Application No. 08713990.3, 7 pages.
Response to Search Report filed Feb. 22, 2012, EP Application No. 08713990.3, 20 pages.
Korean Intellectual Property Office as International Searching Authority, International Search Report and Written Opinion for International Application No. PCT/US2008/087964, Mar. 31, 2009, 11 pages.
First Office Action dated Feb. 27, 2013, U.S. Appl. No. 13/455,720, 5 pages.

THERMALLY SWITCHED REFLECTIVE OPTICAL SHUTTER

CROSS REFERENCE TO RELATED APPLICATIONS

This application is a continuation of U.S. patent application Ser. No. 12/830,068 filed 2 Jul. 2010 entitled "Thermally switched reflective optical shutter," which is a continuation of U.S. patent application Ser. No. 12/172,156 filed 11 Jul. 2008 entitled "Thermally switched reflective optical shutter," each of which is hereby incorporated by reference herein in its entirety. This application is further entitled to the benefit of priority pursuant to 35 U.S.C. §119(e) of U.S. provisional patent application No. 60/959,096 filed 11 Jul. 2007 entitled "Thermally switched reflective optical shutter" and U.S. provisional application 61/015,589 filed 20 Dec. 2007 entitled "Thermally switched reflective optical shutter," each of which is hereby incorporated by reference herein in its entirety.

BACKGROUND

1. Technical Field

The subject matter described herein relates to a device for controlling the flow of light and radiant heat through selective reflection. The technology has particular, but not exclusive, application in passive or active light-regulating and temperature-regulating films, materials and devices, especially as construction materials.

2. Description of the Related Art

The problem of controlling the flow of radiant energy, e.g., light and heat, in particular in applications such as regulating solar heat gain in buildings and in other applications has previously been addressed using many optical methodologies. Photodarkening materials have been used for decades, for example, in sunglass lenses, to selectively attenuate incoming light when stimulated by ultraviolet (UV) radiation. When incorporated into windows, such materials can be used to regulate the internal temperature of a structure by darkening to attenuate bright sunlight, and by becoming transparent again to allow artificial light or diffuse daylight to pass through unimpeded. Such systems are passive and self-regulating, requiring no external signal other than ambient UV light in order to operate. However, because they are controlled by UV light rather than by temperature, such systems are of limited utility in temperature-regulating applications. For example, they may block wanted sunlight in cold weather as well as unwanted sunlight in hot weather.

Electrodarkening materials have also been used to regulate the transmission of light. The most widely used electrodarkening material is a liquid crystal sandwiched between two highly efficient absorbing polarizers, which attenuate slightly more than 50% of the light passing through them, primarily by absorption. This material is controlled by an electric field created by coatings of a transparent, electrically conductive material such as indium-tin-oxide (ITO). These liquid crystal panels are typically used in video displays, which are designed to not be isotropic under operating conditions and have seen only very limited use in building materials. This is, in part, because of the significant infrastructure required to utilize them, including electrical wiring and power sources, and the requirement of either sophisticated control systems, sensors, and algorithms, or extensive user inputs, to set the state of the materials and thus regulate the light, heat, and radiant energy through them. Electrodarkening and photodarkening materials attenuate incoming light primarily through absorption rather than reflection, meaning they will heat up when exposed to bright light. The heat absorbed by these materials may also offset the reductions in radiative transmission, and thus place significant limits on their ability to regulate temperature.

Wire-grid polarizers (WGPs) which reflect infrared light rather than absorbing it, have been used since the 1960s and are described for example in U.S. Pat. No. 4,512,638 to Sriram, et al. With the advent of nanoscale lithography in the 1990s and 2000s, it became possible, though expensive, to produce broadband, wire-grid polarizers that reflect in visible and ultraviolet wavelengths, for use with high-end optics and laser technology as described, for example, in U.S. Pat. No. 6,122,103 to Perkins, et al.

More recently, low-cost reflective polarizer films combining the properties of a layered-polymer distributed Bragg reflector (DBR) with a stretched-polymer polarizer have been introduced. Such reflective polarizers are used in video displays to enhance brightness by reflecting the attenuated light back into the device rather than absorbing it as described, for example, in U.S. Pat. No. 7,038,745 to Weber, et al. and U.S. Pat. No. 6,099,758 to Verrall, et al. Such reflective polarizers can exhibit specular reflection for one polarization of light, as in a mirror, or diffuse reflection for one polarization of light, as in a coating of white paint, or a combination of the two. These films were developed specifically for the video display market and have not been used outside of it.

In addition, reflective polarizers can be made from certain types of liquid crystals. Whereas wire-grid polarizers and stretched polymer polarizers are linearly polarizing, these liquid crystal polarizers (LCPs) are generally circularly polarizing. Thus, light of one helicity (i.e., right- or left-handed) is transmitted and light of the opposite helicity is reflected.

Thermal switches allow the passage of heat energy in their ON or closed state, but prevent it in their OFF or open state. These switches are mechanical relays, which rely on contact between two conducting surfaces (typically made of metal) to enable the passage of heat. When the two surfaces are withdrawn, heat energy is unable to conduct between them except through the air gap. If the device is placed in vacuum, heat conduction is prevented entirely in the open state. Another type of thermal switch involves pumping a gas or liquid into or out of a chamber. When the chamber is full, it conducts heat. When empty, there is no conduction, although radiative transfer across the chamber may still occur.

Light can be blocked by optical filters which absorb or reflect certain frequencies of light while allowing others to pass through, thus acting like an optical switch. Also, the addition of a mechanical shutter can turn an otherwise transparent material—including a filter—into an optical switch. When the shutter is open, light passes through easily. When the shutter is closed, no light passes. If the mechanical shutter is replaced with an electrodarkening material such as a liquid crystal, then the switch is "nearly solid state," with no moving parts except photons, electrons, and the liquid crystal molecules themselves. Other electrodarkening materials, described for example in U.S. Pat. No. 7,099,062 to Azens, et al., can serve a similar function. These optical filter/switch combinations are not passive, but must be operated by external signals, e.g., electrical signals.

Switchable mirrors are based on reversible metal hydride and metal lithide chemistry, described for example in U.S. Pat. No. 7,042,615 to Richardson. These switchable mirrors rely on the physical migration of ions across a barrier under the influence of an electric field and therefore have limited switching speeds and cycle lifetimes. In addition, electrically operated "light valves" combine liquid crystals with one or more reflective polarizers as described, for example, in U.S. Pat. No. 6,486,997 to Bruzzone, et al. In these devices, the liquid crystal typically serves as an electrotropic depolarizer, i.e., as a structure that changes or switches the rotation of the polarity of the light that passes through it on and off under the influence of an electric field. Some of these devices may be thought of as switchable mirrors, although they are rarely described that way, since their primary application is in video displays and advanced optics.

The information included in this Background section of the specification, including any references cited herein and any description or discussion thereof, is included for technical reference purposes only and is not to be regarded as subject matter by which the scope of the invention is to be bound.

SUMMARY

The technology disclosed herein is directed to the temperature-based control over the transmissivity of a window or similar material or structure with regard to radiant energy (e.g., visible, UV, and infrared light), including the entire range of the solar spectrum, for the purpose of regulating the flow of heat into a structure based on external weather conditions, internal temperature, or any combination of the two. This technology may be employed as a device having a temperature-responsive optical depolarizer, for example, a thermotropic liquid crystal) sandwiched between two polarizing filters to regulate the passage of light energy. The incident energies passing through this device will depend on the reflection and absorption efficiencies of the polarizers used. For example, for polarizers that are very efficient at reflecting radiant energy over the frequency bandwidths of interest. For example, up to half of the incident radiant energy passes through the device when it is below a threshold temperature and up to 100% of the incident radiant energy may be reflected away from the device above the threshold temperature, yielding a thermally switched reflective optical shutter (hereinafter "TSROS" or "shutter"). Lower efficiency polarizers, or polarizers with frequency-dependent efficiencies, may be used to effect percentages of reflection above and below the threshold temperatures that are desirable for aesthetics, energy management, or other reasons. This effect can also be reversed such that the TSROS device is reflective in its cold state, or expanded such that the transmissivity of the TSROS is higher in the transparent state, or retarded such that the reflectivity of the TSROS device is lower in the reflective state.

In one implementation, two reflective polarizing filters which transmit light of a polarization parallel to their own, and reflect (not absorb) light of a perpendicular polarization are arranged in succession. When the reflective polarizers are oriented in parallel, up to 50% of the incoming radiant energy may be reflected. In practice, a small amount is also absorbed, so that typically, the light transmission through two parallel polarizers is 30-40%. When the reflective polarizers are oriented perpendicular to one another, up to 50% of the light is blocked at one polarizer and up to the remaining 50% transmitted by the first reflective polarizer is blocked by the second reflective polarizer. In this case, transmission of light through both reflective polarizers is very small (often less than 1%) and the majority of the light (often close to 100%) is reflected back in the direction of incidence.

In another implementation, a switchable depolarizer, which changes the polarization of the light passing through it, is configured in conjunction with two or more polarizers. In one embodiment, the switchable polarizer may be a liquid crystal sandwiched between two sheets of transparent, microtextured material such as polymer-coated glass. The switchable depolarizer may be specifically selected or designed to be thermochromic, its polarization state shifts at a predetermined temperature. In the "off" state, the polarization state of incoming light is largely unaffected by the depolarizer, and in the "on" state, light of a particular polarization, having passed through the first polarizer, is rotated by a set amount. This is typically done to align the light with the second polarizer, either in a parallel or perpendicular state depending on the desired optical effect. Thus, the combination of two reflective polarizing filters and a liquid crystal forms a switchable mirror that reflects either up to 50% or up to 100% of the incoming light, depending on the state of the liquid crystal.

Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

Please note that closely related elements have the same or similar element numbers in all figures.

DETAILED DESCRIPTION

Figure 1:
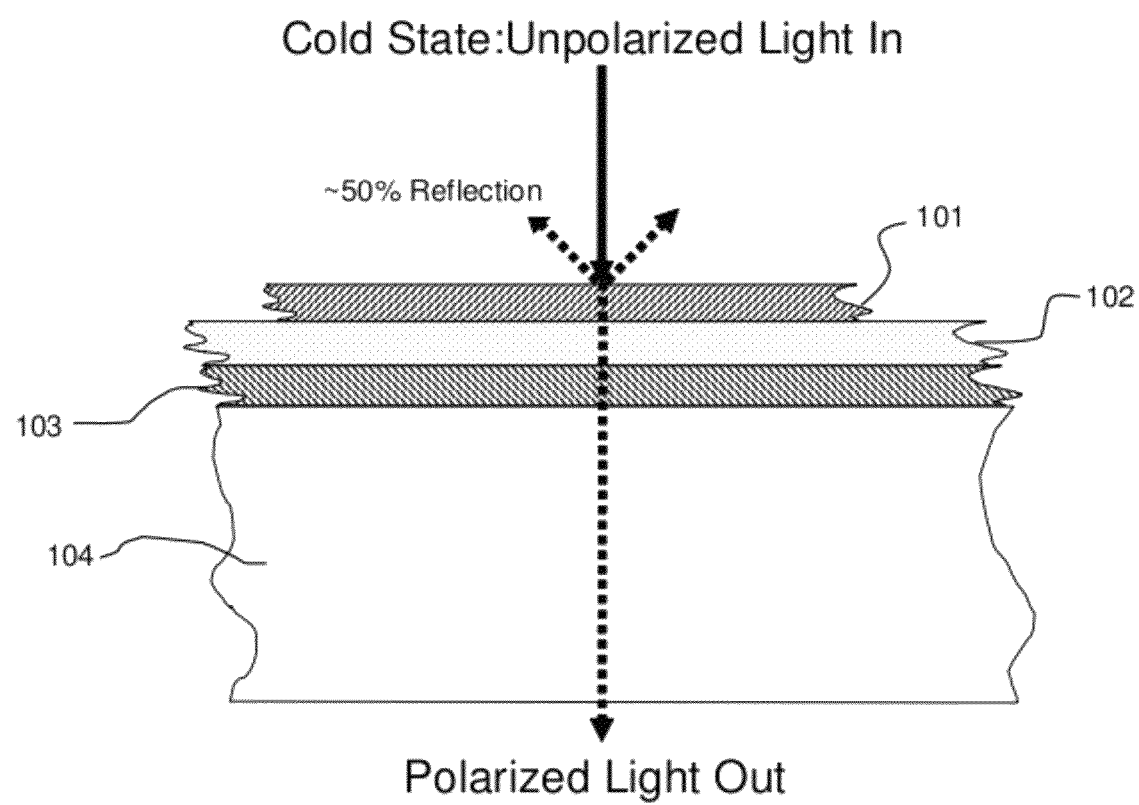
FIG. 1 is a schematic, cross section view of one embodiment of a TRSOS device depicting a layer of thermally sensitive depolarizer material sandwiched between two polarizing filters and attached to a transparent substrate. The action of incoming light is depicted for a cold state of the shutter.

A thermotropic optical depolarizer may be used in conjunction with two reflective polarizers to create a thermally switched reflective optical shutter (TSROS) that allows light and radiant energy to pass through the shutter at low temperatures and reflects it away at high temperatures. The depolarizer is specifically selected or designed to be thermotropic, i.e., its polarization state shifts at a predetermined temperature. The TSROS device has particular, but not exclusive, application in regulating the temperatures of buildings, vehicles, or other structures by controlling the amount of solar radiation they absorb.

The structure, composition, manufacture, and function of liquid crystals, polarizers, and reflective polarizers are well documented, but the following elaboration is presented for better understanding. Many materials exhibit thermotropic properties, including liquid crystals, which transition from an ordered or "ON" state (e.g., crystalline, nematic, or smectic) to a disordered or "OFF" state (liquid, isoptropic, or non-polarizing) state at a temperature known as the "clearing point". For example, 4-butylcyanobiphenyl (CB) liquid crystals have a clearing point of approximately 16.5 degrees centigrade, while 6CB liquid crystals have a clearing point of approximately 29.0 degrees centigrade, and thus "melt" (i.e., become isotropic) under conditions close to room temperature. Mixtures of 4CB and 6CB have a clearing point between these two values, in direct, approximately linear, proportion to the percentage of each component in the mixture. In the "off" state, the polarization state of incoming light is largely unaffected by the depolarizer, and in the "on" state, light of a particular polarization, having passed through the first polarizer, is rotated by a set amount (e.g., 45 or 90 degrees, but also 180 or 270 degrees, or other values not divisible by 45).

In some implementations, the TSROS device in a cold (e.g., crystalline, nematic, or smectic) state reflects up to 50% of the light or other radiant energy that strikes it, and transmits approximately 40%. In a hot (isotropic) state, the TSROS device reflects up to 100% of the incoming light. Thus, it forms a thermally switched, reflective optical shutter. It may be appreciated that the opposite transition—a shutter that is reflective when cold and transmissive when hot—is also possible, depending on the exact arrangement of the polarizer and depolarizer layers.

This technology has particular but not exclusive utility as a building or construction material to regulate the flow of radiant energy (including visible, UV, and IR light) through windows, skylights, and other transparent materials based on temperature, thereby restricting the admission of radiant energy (e.g., sunlight) at high temperatures. Thus, this technology can be used to regulate the internal temperatures of buildings and other structures by controlling the amount of solar radiation they absorb.

For the purposes of this document, the term "thermoreflective" is used herein to describe a device or material with variable reflectivity that varies with or is directly controlled by temperature. The term "radiant energy" is used to refer to visible light, infrared, ultraviolet, radio, microwave, radar, and other wavelengths of electromagnetic radiation that obey the laws of optics. Similarly, whenever the terms "light" or "optical" are used herein, they are intended to encompass any form of radiant energy. The term "optical" as used herein refers to any effect of a material or device on radiant energy, for example, absorption, reflection, transmission, polarization, depolarization, or diffusion.

For the purposes of this document, the term "thermotropic depolarizer" means a material in which the depolarization, e.g., rotation of polarization, varies with or is directly controlled by temperature. One way to construct a thermotropic depolarizer is to hold thermotropic liquid crystal between two alignment layers. The orientations of the thermotropic liquid crystal molecules are influenced both by the alignment layers, e.g., their chemistry and structure, and the temperature or temperature gradient. In a thermotropic liquid crystal which has a nematic state, this structure can be utilized as a waveblock where the rotation of polarization of various frequencies and bandwidths of light are temperature dependent, and where the crystal-like structure of the waveblock collapses above a threshold temperature. Note that this discussion of thermotropic liquid crystals is provided as an example and should not be considered as limiting the scope of the TSROS device.

For the purposes of this document, the term "switch" includes both solid-state and mechanical devices for selectively blocking or permitting the flow of energy, and includes both digital switches (e.g., transistors and relays) and analog regulators (e.g., tubes and rheostats). Furthermore, a valve for selectively blocking or regulating the flow of gases or fluids can be considered analogous to a switch so that, in principle, the two terms can be used interchangeably. By this definition, the TSROS device is a solid-state optical switch, which moves from its "open" or transmissive state to its "closed" or reflective state based on the temperature of the TSROS device.

For the purposes of this document, the term "passive" refers to an object or device that responds to environmental conditions but operates independently of external signals or instructions from an operator. Thus, a device may include a number of complex components—even moving parts—and still be regarded as "passive" for the purposes of this document. Similarly, the possible existence of a user override mode does not alter, in any essential way, the passive nature of such a device. By contrast, an active device is one that requires user input in order to perform its normal functions. As an example, these definitions, light-sensitive sunglasses are a passive device, whereas a standard light bulb operated by a wall switch or dimmer switch is an active device.

For the purposes of this document, the term "depolarizer" refers to an object, device, or substance that rotates or otherwise alters the polarization vector of light passing through it in some way other than attenuation. Separately, the term "polarizer" refers to an object, device, or substance that blocks light of one polarity while transmitting light of orthogonal polarity or, in the case of circularly polarized light, of opposite helicity. Most typically, this blocking occurs by absorption. For the purposes of this document, the term "reflective polarizer" refers specifically to a polarizer that blocks light of one polarity by reflecting it rather than by absorbing it. By this definition, a standard absorptive polarizing filter adjacent to a standard reflecting or semi-reflecting filter is not a reflective polarizer and should not be confused with one.

It should also be understood that some absorption occurs in reflective polarizers, just as some reflection occurs in absorptive polarizers, but that the distinction between reflective-type and absorptive-type polarizers is significant, as the two types rely on different operating principles and produce qualitatively different optical effects. When discussing reflective polarizers, it is convenient to assume for purposes of exemplary discussion that they are 100% efficient (or approximately 100% efficiency) in reflecting light of one polarity and transmit the other polarity of light. However, in actual practice, these polarizers may be less than 100% efficient (e.g., due to design choice or design and manufacturing limits), be partially absorptive, and have frequency-dependent and spacially dependent reflection, absorption, and transmission characteristics (e.g., due to design choice or design and manufacturing limits) and this should not be construed as limiting the scope of the invention.

FIG. 1 is a schematic, cross section view of one embodiment of a TSROS device depicting a depolarizer layer 102 sandwiched between two reflective polarizing filters 101 and 103, and attached to an optional transparent substrate 104. In the most general case the external light source will be unpolarized white light (i.e., light with significant intensity across a significant bandwidth of the visible, near-UV and near-IR spectrum). In one exemplary use of the device, the external light source is the sun. However, the device will also function when the external light source is not white, as for example a street lamp or the diffuse radiant energy of the blue sky.

Incoming light first passes through the outer reflective polarizer 101. Exemplary forms of the reflective polarizer 101 include a wire grid polarizer composed of a microscopic array of metal wires affixed to or embedded within a transparent substrate such as glass or plastic, or a polymer-based reflective polarizing film, or a liquid crystal polarizer (LCP), although other forms may also be used. Note that wire grid polarizers have the property of polarizing across an extremely broad range of wavelengths, including radio, microwave, and radar wavelengths, which may be particularly useful in some applications.

Of the incoming light, approximately 50% will have polarization perpendicular to that of the polarizer 101, and will likely be reflected away. By contrast, an ordinary absorptive polarizer will absorb light with perpendicular polarization, rather than reflecting it, and will consequently heat up. Of the remaining light with polarization parallel to that of the reflective polarizer 101, some percentage is absorbed, and the remainder is transmitted through.

Once it has passed through the outer reflective polarizing filter 101, the incoming light (e.g., sunlight) enters the thermotropic depolarizer 102, which is a device or material capable of exhibiting two different polarizing states. In its hot or isotropic or liquid state, the polarized light passing through it is not affected. In its cold (e.g., nematic or crystalline) state, the thermotropic depolarizer 102 rotates the polarization vector of the incoming light by a fixed amount. In the preferred embodiment, the depolarizer 102 is a twisted nematic liquid crystal that rotates the light's polarization vector by 90 degrees. However, a variety of other devices and materials are capable of serving as well, including nematic liquid crystals oriented at 45 degrees, or at some other angle, to the outer reflective polarizer 101.

Once it has passed through the thermotropic depolarizer 102, the remaining polarized light strikes the inner reflective polarizer 103, also known as the "analyzer", where it is either reflected or transmitted, depending on its polarization state. The inner reflective polarizer 103 is oriented such that its polarization is perpendicular to that of the outer reflective polarizer. Thus, in the device's hot state, when the light's polarization vector has not been rotated, the light's polarity is perpendicular to that of the inner reflective polarizer 103, and up to 100% of it is reflected. However, in the cold state, when the light's polarization vector has been rotated by 90 degrees and is parallel to the inner reflective polarizer 103, some of the light is absorbed by the polarizer material, and the rest is transmitted through.

The action of incoming light is depicted for the device's cold state: the outer reflective polarizer 101 reflects up to 50% of the incoming light. The remaining light passes through the thermotropic depolarizer 102, where its polarization vector is rotated, and then through the inner reflective polarizer or analyzer 103, where it is largely unaffected. It then passes through an optional transparent substrate 104, and finally exits the device. Thus, in its cold state the device serves as a "half mirror" that reflects up to 50% of the light striking its outer surface, absorbs a small amount, and transmits the rest through to the inner surface.

Figure 2:
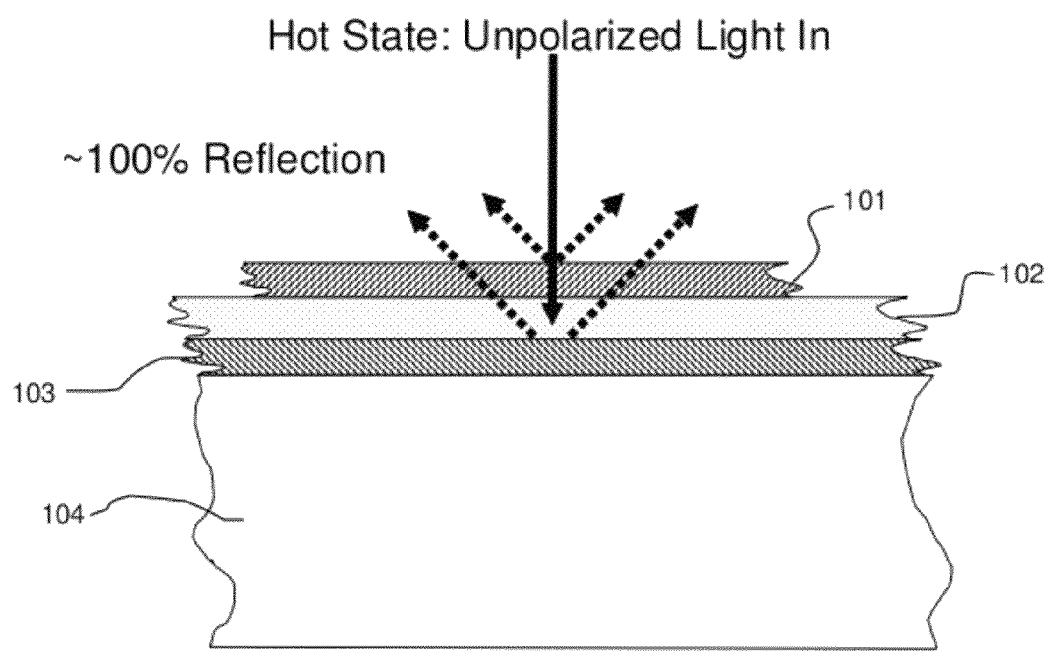
FIG. 2 is a schematic, cross section view of the embodiment of FIG. 1, except that the action of incoming light is depicted for a hot state of the shutter.

FIG. 2 is a schematic, cross section view of the embodiment of FIG. 1, except that the action of incoming light is depicted for a hot state of the shutter. The thermotropic depolarizer 102 does not affect the polarization vector of the light passing through it. Thus, any light striking the inner reflective polarizer is of perpendicular polarity to it, and up to 100% is reflected back. The TSROS device therefore serves as a "full mirror" that reflects up to 100% of the light striking its outer surface.

Thus, in its cold state the shutter transmits slightly less than half the light energy which strikes its outer surface, whereas in the hot state the shutter transmits substantially less than 1% of the light energy. As a result, the shutter can be used to regulate the flow of light or radiant heat into a structure based on the temperature of the shutter.

From the above description, a person of ordinary skill in the art will realize that in this embodiment, the transparent substrate 104 is present only for reasons of structural support and convenience. This component may be deleted without significantly altering the function of the shutter. Alternatively, the transparent substrate 104 could be placed on the outer surface of the shutter rather than the inner surface, or transparent substrates 104 could be placed on both surfaces, or even inserted between one or more of the functional layers of the shutter, without significantly altering its function. Furthermore, if the transparent substrate 104 is located on the inside surface of the shutter as shown in FIGS. 1 and 2, it need not be transparent to all wavelengths, and can in fact be a longpass, shortpass, or bandpass filter as long as the transmitted wavelengths are useful as heat energy, illumination, or for some other purpose. However, for convenience and cost it will generally be preferable to use an ordinary transparent material such as glass or acrylic as the substrate.

Because the eye works on a logarithmic scale, preliminary evidence indicates that a 50% attenuation of incoming light will appear, subjectively, to be approximately 84% as bright as the original, unattenuated light, but may vary. As a balance of aesthetic, human, and energy management factors, preliminary evidence indicates a hot state transmission of approximately 10-20% of incident solar energy, and a cold state transmission of 50-70% of incident solar energy are desirable for window applications. Different transmissivity levels may thus be desirable for different uses and embodiments of the TSROS device.

In one exemplary process for fabricating a TSROS device, the first step is to create the liquid crystal (LC) cell or "bottle". Two sheets of $SiO_2$-coated (passivated) glass are scribed to a pre-determined size and placed in substrate holders. If there is an indium tin oxide (ITO) low emissivity coating on the glass, it should be etched off, leaving the $SiO_2$ in place. The sheets are then placed in a 48 KHz ultrasonic cleaner (e.g., Crest Truesweep set at power level 8) for 15 minutes, using a pH neutral soap mixed at 1 oz per gallon of deionized (DI) water (28 Ohm purity or better). If there are polyimide (PI) wetting issues then the sheets may be rewashed with Detrex soap. Larger sheets may be cleaned instead using a commercial glass washer (e.g., Billco Series 600). The sheets may be dried with isopropyl alcohol (IPA) and placed in a drying oven at 80-85 C for 120 minutes or longer as needed for moisture-free storage and staging, and are then placed in an ozone cleaner for 15 minutes. A PI alignment layer, dissolved in a solvent, is then deposited by spin coating at 500 RPM for 10 seconds followed by 2000 RPM for 45 seconds. Consistent coating requires approximately 1 ml per square inch of Sheet. For sheets too large to spin coat, the PI solution is deposited by inkjet printer. After coating, the substrates are heated to 85 C for 5 minutes to flash away any remaining solvent, and then baked at 180-190 C for 1 hour to harden the PI. The oven door should not be opened until the inside temperature is 85 C or lower.

To prevent contamination of the PI surface, sheets are then stored in a vacuum oven at 50 C until needed. The sheet is then placed in a vacuum fixture to hold it in place, and rubbed with a block of polypropylene or aluminum wrapped with rub cloth material secured with double-sided tape. The rub block is pushed across the surface 25 times in the same direction with no downward pressure other than its own weight. The rub direction is then marked (e.g., with a Sharpie pen) on the uncoated side of the sheet. A plurality of 7.5-micron spacer beads are then applied to the rubbed surface of one sheet with an air puff machine, and a second sheet, with rub direction oriented at 90 degrees from the first substrate, is placed rubbed-side-down atop the first substrate. The edges are sealed first with an optical adhesive (e.g., Norlin 68), which does not interact with the liquid crystal, and then with a waterproof sealer (e.g., Loctite 349), leaving at least two ports open, each approximately 1 cm wide. The Norlin 68 is then UV cured with a dose of at least 4000 mJ/cm$^2$ and either baked for 12 hours at 50 C or else allowed to cure at room temperature for a full week.

The bottle is then placed in a vacuum loader with a pressure of 20 milliTorr or less and at a temperature below the clearing point and above the freezing of the liquid crystal, and lowered into a slot containing the liquid crystal (e.g., a mixture of 5 parts 6CB, 1.25 parts E7 and 0.008 parts 811 with a clearing point of 35 C). The liquid crystal is drawn into the bottle by capillary action. When loading is complete, the bottle is removed from the vacuum chamber, the ports are sealed with Norlin 68 and Loctite 349, and the curing step is repeated, taking care to avoid unnecessary exposure of the liquid crystal mixture to UV light. The bottle is now complete.

Once a bottle is fabricated, it can then be further constructed into a finished TSROS device. Exemplary TSROS devices include a stand-alone, thermoreflective filter (e.g., an LC bottle, polarizers, and UV protection only) and an insulated glass unit (IGU) or "double-paned window" with the thermoreflective filter laminated to one pane. To fabricate a thermoreflective filter, the LC bottle is laminated several times with layers of optically clear sheet adhesive (e.g., 3M 8141 and 3M 8142 optically clear adhesive), and reflective polarizer films (e.g., 3M advanced polarizing film (APF) or diffusive polarizing reflective film (DRPF)). A layer of UV shielding is then applied (e.g., GamColor 1510 UV film). All lamination steps are performed in a class 10,000 cleanroom environment with a class 1,000 downdraft hood to prevent particulates from causing air bubbles in any of the adhesive layers.

The process begins by using a 6 ft automatic/manual roll laminator to begin applying adhesive to the bottle. Using preset increments on the leveling knobs, an elevation is set on the laminator to avoid damaging the bottle. One layer of 3M 8141 is applied to the bottle, followed by a layer of either APF or DRPF. The process is then repeated on the reverse side of the bottle, with the polarizer film at 90° rotation from the previous layer. One more layer of 3M 8141 is applied to either side of the bottle, and then a layer of UV shielding is applied as the last step. At this point, the bottle has become a thermoreflective filter.

In order to fabricate an insulating glass unit (IGU) from the LC bottle, further lamination is required. The thermoreflective filter is given two consecutive layers of 3M 8142 over the UV shielding. Tempered glass, typically larger than the bottle by 1-2 in, is then also given two consecutive layers of 3M 8142. The layers on the tempered glass are laminated with tape underneath the border to prevent the 3M 8142 from completely covering the glass. The adhesive backing is then removed from both the LC bottle and the tempered glass pane. The adhesive sides of each are placed together and then run through the laminator a final time, again set at an elevation that is suitable for lamination and prevents damaging the bottle. The assembly can now have a standard insulated glass unit built around it. Standard aluminum spacers with desiccant are used to separate the two panes of IGU glass and are attached to the glass with PIB bonding beads and sealed around the edges with polyisobutylene (PIB) hot-melt sealant. The IGU is now ready for shipping and installation.

Figure 3:
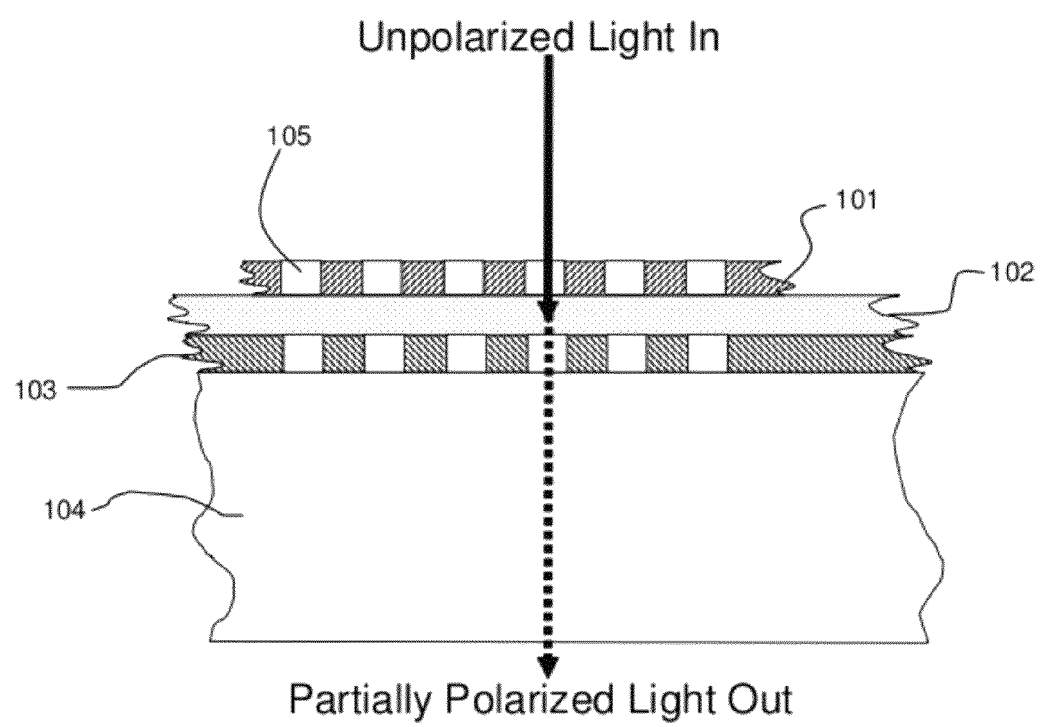
FIG. 3 is a schematic representation of another embodiment of a TSROS device in which the polarizers define apertures or transparent areas to allow some unpolarized light from the external source to pass through the shutter without modification.

FIG. 3 is a schematic representation of another embodiment of a TSROS device, in which there are gaps 105 in one or both polarizers 101 and 103 to allow some unpolarized light from the external source to pass through the shutter without modification. These gaps 105 may take the form of holes or stripes, or alternatively the polarizer material itself may be applied in stripes or spots. However, a person of ordinary skill in the art will understand that there are numerous alternate methods for fashioning the gaps 105 that need not be elaborated here. This embodiment may be useful, for example, in windows that are required to offer a relatively clear, unattenuated view. In this case, the attenuation or obstruction of the polarizers 101 and 103 in the reflective state would be similar to looking through a normal window screen.

The use of polarizers 101 and 103 with gaps 105 in place of uniform polarizers increases the transmission of energy through the shutter under all conditions, and thus reduces the ability of the shutter to reflect light and radiant energy in its hot state. However, this arrangement may be advantageous under circumstances where cold-state transparency is more important than hot-state reflectivity.

It may be noted that a similar effect can be achieved by rotating the two polarizers with respect to one another, to an angle greater than zero and less than 90 degrees, although this method can only increase transparency in the hot state of the shutter, and may (depending on the exact geometry of the shutter and the exact properties of the depolarizer) actually decrease transparency in the cold state. Assuming the polarizer is operating efficiently, the transparency in the cold state can never be greater than 50%—the state that occurs when two ideal polarizers are placed in parallel orientation. However, greater transparency can be achieved in the cold state—at the expense of reflectivity in the hot state—if the polarization efficiency is less than 100%.

Also note that gaps in, or other alterations to, the liquid crystal alignment layer can produce an effect similar to having gaps in the polarizer, and that under some circumstances this may be easier or otherwise more desirable. Also, gaps 105 of any sort can be arranged so that only indirect light is able to pass through the shutter.

Figure 4:
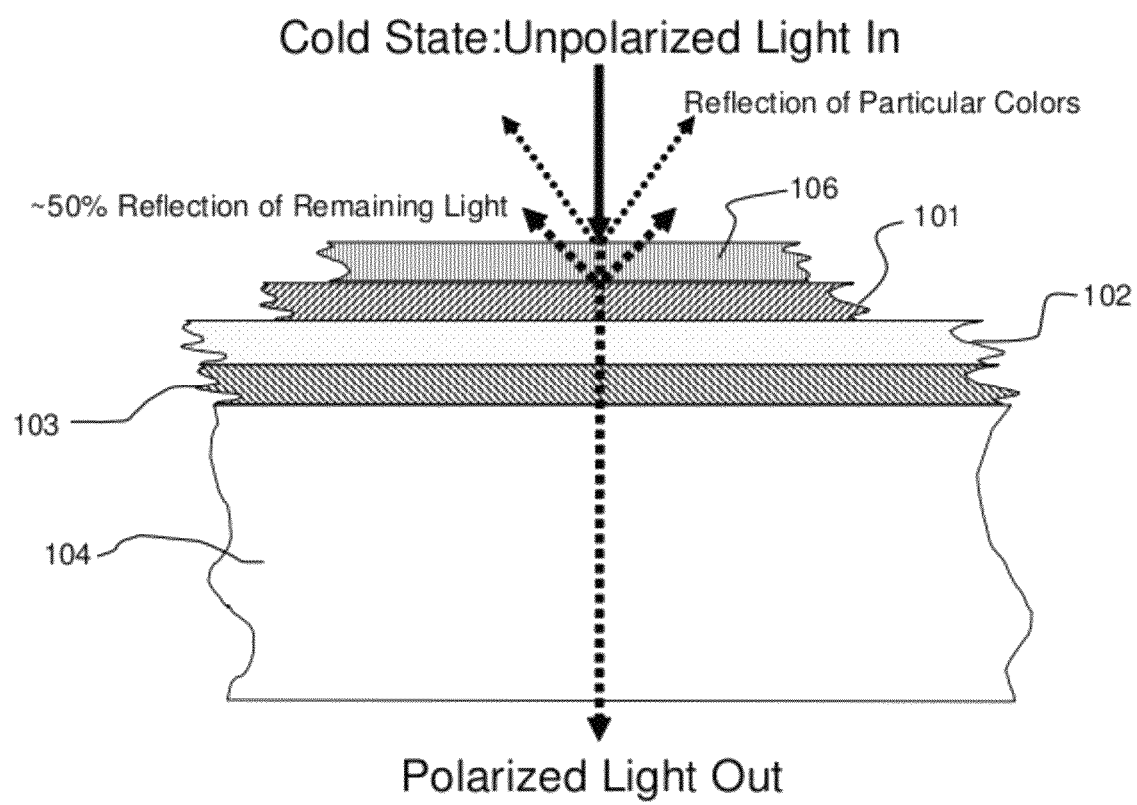
FIG. 4 is a schematic representation of an additional embodiment of a TSROS device in which an optional color filter has been included for aesthetic or other reasons.

FIG. 4 is a schematic representation of an additional embodiment of a TSROS device in which an optional color filter 106 has been added. Exemplary forms of the color filter 106 may include a band reflector (such as a distributed Bragg reflector (DBR) or rugate filter), which is designed to reflect a narrow range of wavelengths and transmit all others, or a bandpass filter (e.g., a sheet of colored glass or plastic), which is designed to transmit a range of wavelengths and reflect or absorb all others.

The color filter 106 is depicted as being on the exterior surface of the shutter. However, a person of ordinary skill in the art will understand that different aesthetic or optical effects could be created by placing the color filter 106 behind other layers in the shutter. For example, if the color filter 106 were placed on the inner surface of the shutter, then the color would not be apparent to an exterior observer when the shutter was in its hot, or 100% reflective, state.

The use of a color filter will reduce the amount of light and radiant energy transmitted through the shutter in its cold, or 50% reflective, state. However, this arrangement may be advantageous under circumstances where aesthetics, rejection of key wavelengths, or hot-state reflectivity are considered more important than cold-state transparency.

Alternatively, instead of an additional color filter layer, the shutter can be used with one or more colored polarizers (i.e., one which does not absorb or reflect across the entire visible spectrum) in place of one of the reflective polarizers. One exemplary colored polarizer is the 3M DBEF reflective polarizing film, which yields a magenta color (a combination of red and blue) in the hot or reflective state.

Figure 5:
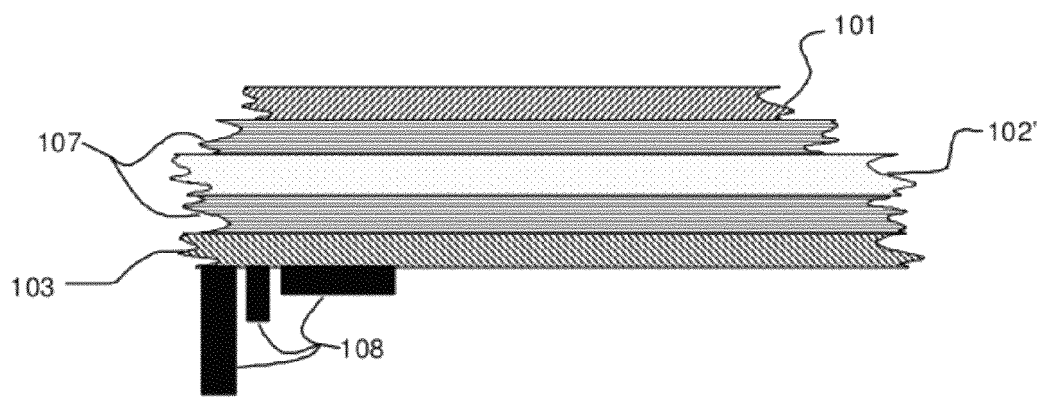
FIG. 5 is a schematic representation of a further embodiment of a TSROS device, in which the thermotropic depolarizer has been replaced with, or additionally serves as, an electrotropic depolarizer, through the addition of two transparent electrodes and a control system.

FIG. 5 is a schematic representation of a further embodiment of a TSROS, in which the thermotropic depolarizer 102 has been replaced with, or additionally serves as, an electrotropic depolarizer 102', plus two transparent electrodes 107 and a control system 108, which collectively perform the same function.

An exemplary form of the transparent electrodes is a thin layer of indium tin oxide (ITO). The control system 108 includes a temperature sensor, power supply, and controller hardware. An exemplary form of the control system 108 is a thermostat and LCD controller consisting of a thermocouple connected to a programmable microcontroller and powered by a small battery or photovoltaic cell. When the sensed temperature falls below a threshold value, the control system applies an AC or DC voltage between the transparent electrodes 107 that creates an AC or DC electric field across the electrotropic depolarizer 102', such that its polarization properties are altered (e.g., by reorienting liquid crystal molecules). The design of such control systems is commonplace in the prior art and needs no detailed elaboration herein. The operation and use of this embodiment are otherwise identical to operation and use of the embodiment shown in FIGS. 1 and 2.

Figure 6:
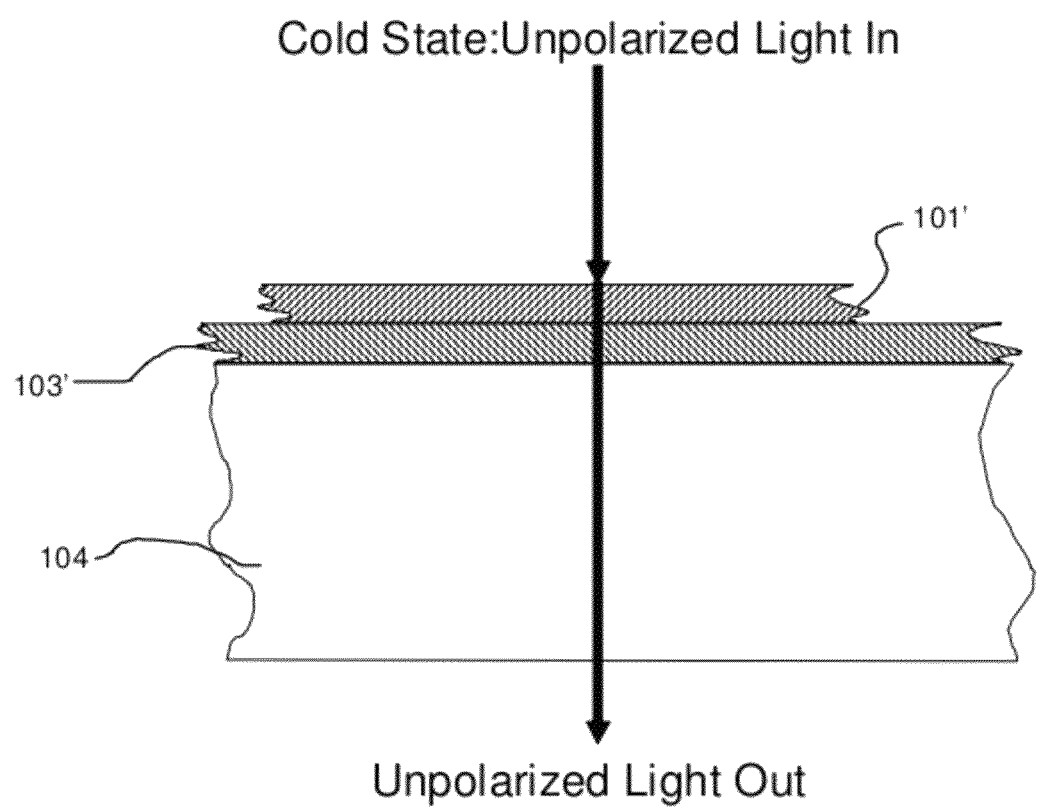
FIG. 6 is a schematic representation of an additional embodiment of a TSROS device, wherein the thermotropic depolarizer has been deleted, and the reflective polarizers themselves are thermotropic. The action of incoming light is depicted for a cold state of the shutter.

FIG. 6 is a schematic representation of an additional embodiment of a TSROS device, wherein the thermotropic depolarizer 102 has been deleted, and the reflective polarizers 101' and 103' are thermotropic. The design of the thermotropic reflective polarizers 101' and 103' is such that they polarize normally in the hot state, and are minimally polarizing or nonpolarizing in the cold state. Thus, in the cold state, unpolarized light entering the shutter encounters the outer polarizer 101' in its nonpolarizing state, and is not significantly affected by it, and then encounters the inner thermotropic reflective polarizer 103' in its nonpolarizing state, and is not significantly affected by it either. Thus, except for some minor absorption, reflection, and scattering associated with transmission through the transparent substrate and the thermotropic reflective polarizers in their nonpolarizing state, essentially 100% of the incoming light is transmitted through the shutter.

Figure 7:
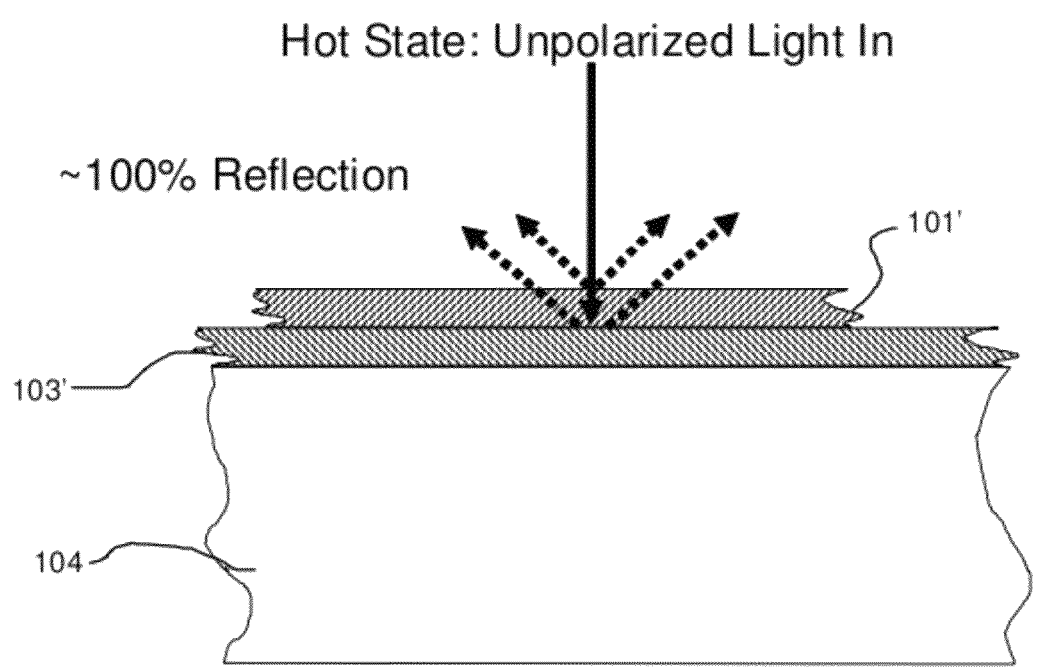
FIG. 7 is a schematic representation of the embodiment of FIG. 6, except that the action of incoming light is depicted for a hot state of the shutter.

FIG. 7 is a schematic representation of the embodiment of FIG. 6 in a hot state. In this case both thermotropic reflective polarizers 101' and 103' are in their fully polarizing configuration, with no depolarizer between them. Thus, when unpolarized light encounters the outer thermotropic reflective polarizer 101', up to 50% of it is reflected as in the other embodiments. The light that passes through is of opposite polarity, and therefore up to 100% of it is reflected. Thus, in its cold state the shutter is up to 100% transmissive, and in its hot state it is up to 100% reflective. As in other embodiments, this ideal reflection occurs when the two thermotropic reflective polarizers 101' and 103' are oriented 90 degrees apart; the amount of transmission and reflection in the hot state may be adjusted by misaligning the two thermotropic reflective polarizers 101' and 103', and the amount of transmission and reflection in the cold state can be adjusted by placing a depolarizer between the thermotropic reflective polarizers 101' and 103'.

Figure 8:
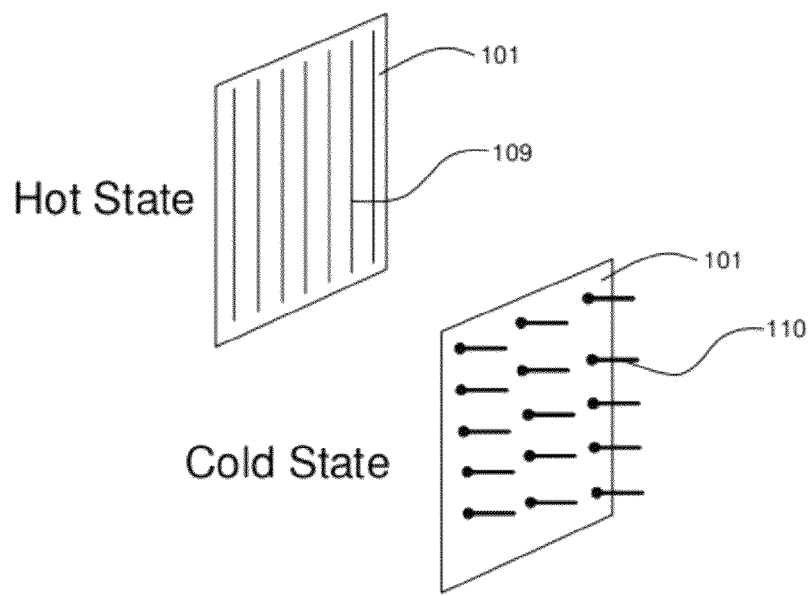
FIG. 8 is a schematic representation of an exemplary thermotropic reflective polarizer in both the hot and cold states.

FIG. 8 is a schematic representation of an exemplary thermotropic reflective polarizer 101, in both its hot and cold states. In this exemplary embodiment, the polarizer 101 is a wire grid polarizer composed of parallel metal wires 109. However, unlike standard wire grid polarizers, the polarizer in this embodiment is a MEMS (microelectrical-mechanical systems) device with wires 109 composed of wire segments 110 made of a conductive, thermotropic material that changes its physical shape in response to temperature. Examples of such materials include, but are not limited to, shape memory alloys such as copper-aluminum-nickel alloy. In this exemplary embodiment, the wire segments 110 are formed such that they lie flat at high temperatures, and stand up away from the surface at low temperatures. Thus, above a certain threshold temperature, the individual wire segments 110 lie flat enough to come into physical contact with one another and form continuous wires 109, which collectively form a wire grid polarizer 101 or 103. However, it may be understood that other forms of thermotropic reflective polarizers are also possible, including versions composed of liquid crystals or nanoengineered optical and photonic materials or so-called "metamaterials", and that these or other forms of thermotropic reflective polarizer can be employed in place of the design shown in FIG. 8 without altering the fundamental nature, intent, or functioning of this implementation.

Figure 9:
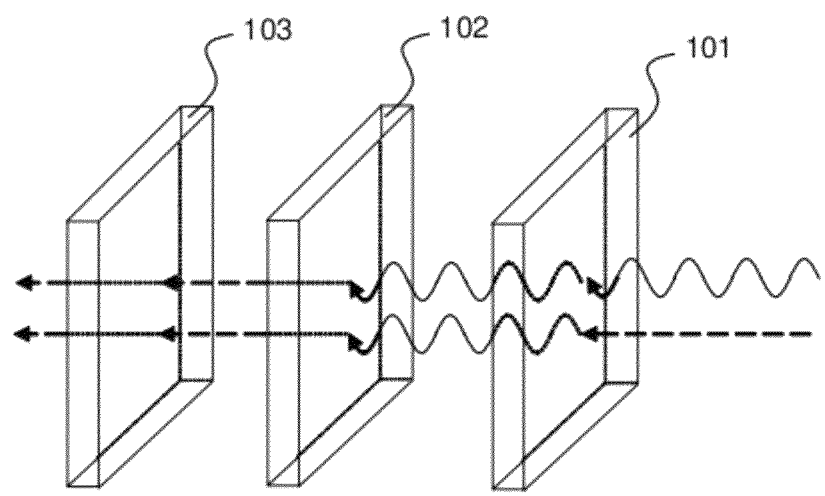
FIG. 9 is a schematic representation of an additional embodiment of a TSROS device, wherein the first polarizer is a polarity-rotating polarizer.

FIG. 9 is a schematic representation of still another embodiment of a TSROS device, in which the outer reflective polarizer 101 has been replaced with a "polarity-rotating polarizer." Whereas an absorptive polarizer absorbs light of opposite polarity and a reflective polarizer reflects light of opposite polarity, a polarity-rotating polarizer converts light of opposite polarity into light of matching polarity. Thus, the polarizer 101 is up to 100% transmissive, and all the light that exits it has the same polarity. In the figure, incoming light of matching polarity strikes the outer polarizer 101 and is transmitted through. Light of opposite polarity strikes the outer polarizer 101 and is "rotated" so that its polarity matches that of the polarizer.

FIG. 9 depicts the operation of this embodiment in the cold state: the polarized light then enters the depolarizer 102, which is in its cold, organized state (e.g., a twisted nematic state) and thus functions to rotate the polarity of all the light passing through it, to match the polarity of the second polarizer or analyzer, 103, which is a standard reflective polarizer as in other embodiments previously described. Since the depolarized light matches the polarity of the second polarizer 103, it is transmitted through. Therefore, in this embodiment the TSROS device is up to 100% transmissive in the cold state. In the hot state, the depolarizer 102 becomes disorganized (i.e., the liquid or isotropic state) and does not affect the polarity of the light passing through it. Therefore, since the light is of opposite polarity to the second polarizer 103, up to 100% of the light is reflected back. Thus, the TSROS device is up to 100% reflective in its hot state.

Figure 10:
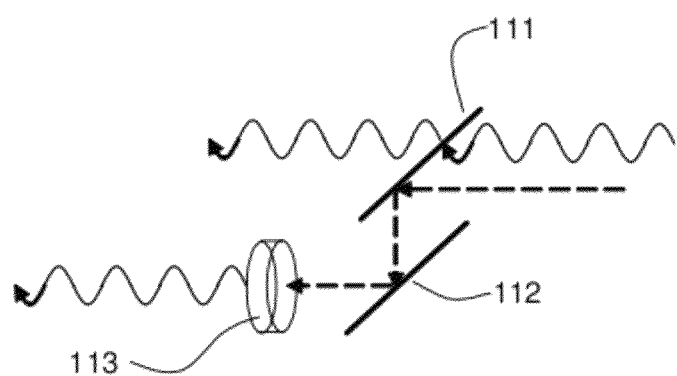
FIG. 10 is a schematic representation of an exemplary polarity-rotating polarizer, in a cold state.

FIG. 10 is a schematic representation of an exemplary form of a polarity-rotating polarizer device, consisting of a wire grid polarizer 111, a mirror 112, and a depolarizer 113. When light of matching polarity strikes the polarizer 111, it is transmitted through. However, when light of opposite polarity strikes the polarizer 111, it is reflected at a 45-degree angle to the mirror 112, which also reflects it at a 45-degree angle such that the light is traveling once again in its original direction. At this point, the reflected light passes through a permanent depolarizer (also known as a waveblock or waveplate) that rotates its polarity by a specific amount (usually 90 degrees). Thus, the polarity of the reflected light now matches the polarity of the transmitted light. Therefore, the polarity-rotating polarizer transmits up to 100% of the light that strikes it, while ensuring that all of the light is of the same polarization.

It should be appreciated that myriad other arrangements of optical components can achieve the same effect, and that other types of polarity-rotating polarizers may be discovered as well, including polarizer materials based on nanostructured optical or photonic materials, so-called "metamaterials", and other materials that function on different principles. However, the basic functioning, intent, and performance of the present implementation is not affected by the exact nature of polarity-rotating polarizer employed.

Figure 11:
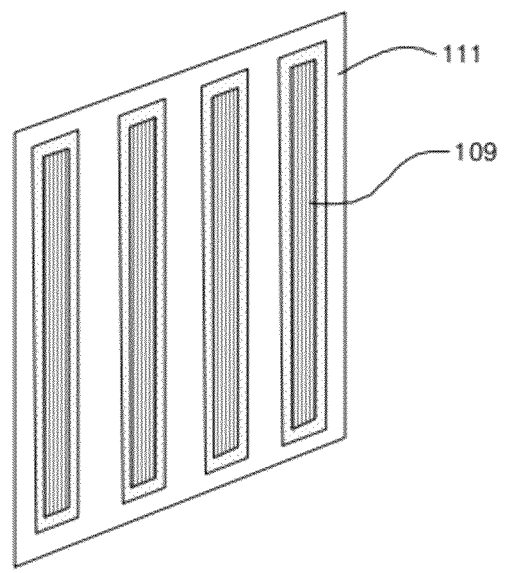
FIG. 11 is a schematic representation of an exemplary photovoltaic polarizer.

FIG. 11 is a schematic representation of still another type of reflective polarizer, a photovoltaic polarizer, wherein, the conductive wires 109 of a wire grid polarizer 111 have been replaced with photovoltaic strips. In the preferred embodiment, these strips 109 are Shotkey-type diodes consisting of a thin film of metal (e.g., aluminum) on top of a thin film of semiconductor (e.g., silicon). However, other photovoltaic materials or devices could be substituted with no essential change to the nature or functioning of this embodiment of a TSROS device. In this arrangement, while the photovoltaic strips 109 reflect a significant fraction of the light that hits them with opposite polarity, as with an ordinary wire grid polarizer, a significant fraction of this light is also absorbed in the form of electrical potentials which can be harvested to create an electrical current. The design and functioning of photovoltaic devices is well described in the prior art and needs no further elaboration here.

However, it should be understood that one or more photovoltaic polarizers can be employed in the present implementation, such that a portion of the light blocked by the polarizer or polarizers can be exploited in the form of electrical power. This occurs in addition to the normal thermoreflective behaviors of the shutter.

A TSROS device is passive, self-regulating—requiring no external signals or user inputs in order to function and thus may be considered a so-called "smart material." The TSROS device may also be understood as a nearly-solid-state optical switch. In some implementations, aside from a thin film of liquid crystal molecules, the switch contains no moving parts, other than photons and electrons. The TSROS device regulates, based on temperature, the amount of light and radiant energy that passes through it. The shutter can thereby be used to help regulate the internal temperatures of buildings, vehicles, and other structures by controlling the reflection and absorption of solar energy or other incident light energy.

The TSROS device may have multiple configurations. For example, if the TSROS device is configured to transmit and reflect diffuse visible light, it may serve as an aesthetic, energy-regulating replacement for translucent building materials such as glass block, privacy glass, and textured polymers. Alternatively, if the TSROS device is configured to transmit and reflect collimated visible light with little diffusion, it serves as an aesthetic, energy-regulating replacement for transparent building materials such as glass or polymer windows. Further, if the TSROS device is configured to show reflection or transmission peaks in the visible spectrum, it may serve as an energy-regulating replacement for stained glass, tinted windows or window appliqués and coatings, or colored artificial light sources. The physical instantiation of a TSROS device may be thick or thin, strong or weak, rigid or flexible, monolithic or made up of separate parts, without altering its basic function in any significant way.

While several exemplary embodiments are depicted and described herein, it should be understood that the present invention is not limited to these particular configurations. Optional components such as antireflective coatings or films may be added or moved to suit the needs of a particular application or a particular manufacturing method, and degraded forms of some embodiments can be produced by deleting or substituting certain components. For example, replacing one, (but not both, of the reflective polarizers with an ordinary absorptive polarizer would result in a TSROS device that is up to 50% reflective, 40% transmissive, and 10% absorptive in its cold state, and up to 50% reflective, 50% absorptive, and less than 1% transmissive in its hot state. Such a TSROS device would absorb heat in its hot state, and thus would not block heat as effectively. Nevertheless, this arrangement might be advantageous if, for example, the cost of the TSROS device is considered more important than its performance.

In addition, it is possible to enhance the performance of a TSROS device by improving its cold-state light transmission, reflection, or absorption, by increasing or decreasing its thermal conductivity and/or thermal capacity. Furthermore, it is possible to increase the transparency of the TSROS device in both the cold and hot states by adjusting the structure of one or both polarizing layers (e.g., by alternating stripes or spots of polarizer material with transparent material). It is possible to increase or decrease the transparency of the TSROS device in the hot state, though not in the cold state, by adjusting the orientation of the polarizers with respect to one another (i.e., less than 90 degrees will produce less than 100% reflectivity in the hot state). It is also possible to increase or decrease the transparency of the TSROS device in the cold state by adjusting the rotation of polarized light provided by the depolarizer. The TSROS device is also functionally enhanced for certain applications through the addition of optional features such as anti-reflection coatings, low-emissivity coatings, concentrating lenses, air gaps or vacuum gaps, phase change materials, or translucent thermal insulators including but not limited to foamed glass and silica aerogels.

Various polarizer types (including but not limited to wire grid polarizers, stretched polymer polarizers, liquid crystal polarizers, absorptive polarizers, specular reflective polarizers, diffuse reflective polarizers, thermotropic polarizers whose function changes with temperature, and polarity-rotating polarizers) can be combined in an enormous number of different arrangements to achieve effects similar to those described in this application, without fundamentally deviating from the spirit of the invention. For example, the reflective polarizers may be selected such that each has a different polarizing nature, e.g., the polarizing natures could be opposing as specular vs. diffusive or reflective vs. absorptive, at different frequencies.

Although the maximum control over energy transport for the TSROS device occurs when the range of reflected wavelengths is as large as possible, the addition of color filter layers can alter the transmission spectrum (i.e., the color) of the light passing through the TSROS device, for aesthetic or other reasons. In addition, it is possible to add a reflective "color" to the surface of the TSROS device, with minimal effect on its efficiency, by adding one or more bandblock filters to reflect particular wavelengths of light. The resulting optical properties do not closely resemble those of any other building material, although they may bear a passing resemblance to certain types of sunglasses. It is also possible, for aesthetic, heat and light management, or other reasons, to use spectrally selective polarizers that operate only over a particular range (or multiple ranges) of wavelengths, as well as polarizers which have different polarization efficiencies and degrees of absorptivity and reflectivity over particular ranges (or multiple ranges) or wavelengths.

Although the materials and structures of a TSROS device may be rigid, there is no requirement for rigidity in order for it to perform the functions described herein. Furthermore, while the various components of the TSROS device are shown and described as being attached or in direct physical contact, the TSROS device will also function if the components are merely adjacent but physically separate. Thus, while the TSROS device can be embodied as a solid object (e.g., a window, glass block, spandrel, or movable panel) or group of solid objects (e.g., components affixed to an optical workbench), it can also be embodied as a flexible object such as, for example, a tent material, blanket, curtain, or an appliqué film which can be applied to the surface of glass windows, spandrels, or glass block building materials.

In addition, a wide variety of alternative materials can be used to manufacture the device, including, metals, ceramics, semiconductors, glasses, polymers, nanostructured and microstructured photonic materials, metamaterials, liquid crystals, and even ices, liquids, and vapors. The device may include features designed to enhance its thermal insulation properties including but not limited to air gaps, vacuum gaps, foams, beads, fiber pads, or aerogels. It may also include features designed to improve thermal sensing, response, and transition temperature accuracy capabilities, such as conductive adhesives, materials with large or small thermal masses, and phase change materials. It may be thick and rigid enough to serve as a structural component of vehicles or building walls. It may be wrapped around or formed upon complex surfaces. It may be aesthetically enhanced with color, or it may be camouflaged to resemble more conventional building materials. Thermochromic pigments may be added to certain surfaces to indicate when they are hot or cold.

Additives, e.g., chiral liquid crystal may be included in the thermotropic depolarizer to set a preferred direction of rotation of polarized light. This may improve the speed and optical properties of the transition between states. A solvent (e.g., Merck liquid crystal solvent ZLI1132) may be used as a base to create a mixture of liquid crystals. Additionally, additives may be included in the depolarizer, for example, to improve the temperature stability of transitions or to reduce the suceptability of the depolarizer to light or energy of particular wavelengths or ranges of wavelengths to reduce chemical susceptibility to breakdown due to UV light, to prevent the absorption of certain wavelengths of light and conversion into heat, or to mitigate changes in transition temperatures due to chemical breakdown of other components). For example, hexane and chloroform may be introduced to adjust the freezing temperature or lower viscosity. Mechanical enhancements may be added to reorient components, either to face them toward or away from incoming light, or to alter their wavelength response or apparent thickness.

The exact arrangement of the various layers can be different than is depicted here, and (depending on the materials and wavelengths selected) different layers can be combined as single layers, objects, devices, or materials, without altering the essential structure and function of a TSROS device. Although the description above contains many specificities, these should not be construed as limiting the scope of the invention but rather construed as merely providing illustrations of certain exemplary embodiments of this invention. There are various possibilities for making the TSROC device of different materials, and in different configurations. For example, the structure could be inflatable or could be optimized for use underwater or in outer space instead of in normal air.

In addition, the TSROS device could incorporate one or more additional polarizers, whether parallel or rotated at some angle to one another and to the original two polarizers, in order to modify the polarization state of light at various positions within the TSROS device. In an embodiment incorporating multiple polarizers, not all of the polarizers will necessarily be reflective polarizers, although at least one must be. Numerous combinations of polarizer angle and liquid crystal molecule orientation can be used to produce different optical effects (e.g., reflective when cold instead of reflective when hot, different colors in the transmissive state, etc.). The depolarizer can employ a wide variety of different combinations of nematic, twisted nematic, smectic, solid/crystalline, discotic, chiral, and other physical/molecular states, as well as alternative liquid crystal technologies such as polymer stabilized cholesterics, and guest-host cells, with or without electric fields, textured surfaces, internal guide wires, or other means to reorient the component molecules.

It is possible to make depolarizers which are diffusive in the cold state and specular in the hot state (and reverse), are opalescent in one or both states, change the color balance of the transmitted and reflected light differently as the temperature changes, and similarly have different color balances when in the hot and cold state. Through the use of lenses, prismatic films, directionally sensitive polarizers, or non-parallel orientation of reflective components, reflections from the TSROS device can be sent in any direction, or can be diffused to limit the blinding "second sun" effect that sometimes occurs near large, mirrored surfaces. Additionally, it is possible to use polarizers that act on any of the various polarizations of light, (e.g. circular, elliptical, and linear). Such embodiments are explicitly claimed as part of the present invention.

Numerous other variations exist which do not affect the core principles of the invention. For example, the depolarizer or one or more polarizers could be mechanical in nature, physically rotating by 90 degrees (or by some other amount) in response to a shift in temperature. Alternatively, the thermotropic depolarizer could be designed such that its temperature affected the range of wavelengths over which it operated, rather than (or in addition to) affecting its ability to depolarize. For example, a waveblock made from a material with very high coefficient of thermal expansion would have this property. Any or all of the layers in the device could be composed of doped, nanostructured, or microstructured materials including but not limited to custom photonic crystals. One or more layers could be non-planar in shape (e.g., parabolic mirrors formed from reflective polarizers), or other shaped reflectors or similar devices could be incorporated, to help concentrate, diffuse, or otherwise affect incoming light from a variety of angles.

The use of a TSROS device as a thermally-regulating building material may be enhanced by careful positioning of the device, for example by placing it under the eave on the south face of a house so that the device is in full sunlight during winter days and is shadowed by the eave on summer days when the sun is higher in the sky. Alternatively, it can be used in place of traditional skylights, or as a panel or appliqué affixed to ordinary glass windows or glass blocks. In some cases, it may also be desirable to place opaque, energy-absorbing materials behind a thermoreflective material or device in order to maximize the absorption of heat energy in the cold (transparent) state.

While a TSROS device as disclosed herein has particular application as a building material, particularly for the exterior skin of structures exposed to sunlight, it can be used in myriad other ways as well. For example, a thermoreflective material or device could be incorporated into shower doors such that the presence of hot water or steam causes the door to become reflective, guaranteeing the privacy of the occupant. Similarly, a coffee pot could be made thermoreflective, such that the presence of hot coffee in the pot would be obvious to any observer.

In addition, a TSROS device can be used to display temperature-controlled reflective images. Such images, including text, line drawings, corporate logos, and monochromatic photographs, can be produced by arranging thermoreflective materials in the shape of the desired image, or by selectively varying the temperature response of the thermoreflective materials in particular areas so that the image appears at particular temperature or range of temperatures, or by manipulating liquid crystal alignment layers or other molecular alignment processes such that the material's thermoreflective response is enhanced or reduced in particular areas to form the image, or by other methods which do not fundamentally alter the nature of the image or its underlying technology. Such images can include reflective optical components such as mirrors, half-mirrors, gratings, grids, and fresnel lenses, such that the thermoreflective material or device exhibits markedly different optical properties at high temperature than at low temperature.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. All directional references e.g., proximal, distal, upper, lower, inner, outer, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Stated percentages of light transmission, absorption, and reflection shall be interpreted as illustrative only and shall not be taken to be limiting. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A device for regulating the reflection of incident radiant energy to control an internal temperature of a building, a vehicle, or other structure comprising
a first reflective polarizer;
a second polarizer; and
a twisted nematic, thermotropic liquid crystal positioned between the first reflective polarizer and the second polarizer that is directly responsive to environmental temperature to rotate a polarity of the incident radiant energy from a polarity of the first reflective polarizer to a polarity of the second polarizer when in a twisted nematic state; wherein
when below a threshold temperature the liquid crystal is in the twisted nematic state; and
when above the threshold temperature the liquid crystal is in an isotropic state and has no rotational effect on the polarity of the incident radiant energy.

2. The device of claim 1, wherein the threshold temperature is at or around room temperature.

3. The device of claim 1, wherein the threshold temperature is between 16.5 degrees C. and 29.0 degrees C.

4. The device of claim 1, wherein
above the threshold temperature up to 100% of incident light is reflected by the device, and
below the threshold temperature up to 50% of incident light is reflected by the device.

5. The device of claim 1, wherein
at a first temperature a first percentage of the incident radiant energy is reflected from the device and a second percentage of the incident radiant energy is transmitted through the device; and
at a second temperature a third percentage of the incident radiant energy is reflected from the device and a fourth percentage of the incident radiant energy is transmitted through the device.

6. The device of claim 1, wherein the second polarizer is an absorptive polarizer.

7. The device of claim 1, wherein either or both of the first reflective polarizer or the second polarizer are a diffuse reflective polarizer.

8. The device of claim 1, wherein either or both of the first reflective polarizer or the second polarizer are a polarity-rotating polarizer.

9. The device of claim 1, wherein the first reflective polarizer and the second polarizer each define transparent areas to allow transmission of radiant energy through the device.

10. The device of claim 1 further comprising an electrotropic control system to place the thermotropic liquid crystal in the twisted nematic state outside of the threshold temperature.

11. The device of claim 1, wherein the thermotropic liquid crystal further comprises an additive in a mixture with the thermotropic liquid crystal to affect optical properties of the thermotropic liquid crystal, a speed of transition between physical states of the thermotropic liquid crystal, or both.

12. The device of claim 1 further comprising
a first pane of glass;
a second pane of glass parallel to and spaced apart from the first pane of glass, wherein
the first reflective polarizer, the thermotropic liquid crystal, and the second polarizer are positioned between the first and second panes of glass;
the first reflective polarizer is adhered to a surface of the first pane of glass opposite the second pane of glass.

13. The device of claim 1, wherein the device is in a form of a flexible film.

14. The device of claim 1, wherein the second polarizer is a reflective polarizer.

15. The device of claim 14, wherein
the first reflective polarizer reflects up to 50% of the incident radiant energy and transmits a majority of non-reflected radiant energy; and
the second polarizer reflects up to 100% of the radiant energy transmitted by the first reflective polarizer when the thermotropic liquid crystal is above the threshold temperature and transmits up to 100% of the radiant energy transmitted by the first reflective polarizer when the thermotropic polarizer is below the threshold temperature.

16. The device of claim 1, wherein either or both of the first reflective polarizer or the second polarizer are a thermotropic reflective polarizer.

17. The device of claim 16, wherein above the threshold temperature down to 0% of the incident radiant energy is transmitted by the device, and below the threshold temperature up to 100% of the incident radiant energy is transmitted by the device.

18. The device of claim 13, wherein the second polarizer is spaced apart from the second pane of glass.

19. The device of claim 1, wherein the first reflective polarizer and the second polarizer are oriented with respect to each other such that a difference in alignment of polarity between the first reflective polarizer and the second polarizer is 90 degrees.

* * * * *